G. C. KNIGHT.
PLANTER AND CULTIVATOR.
APPLICATION FILED MAR. 24, 1913.
1,085,438.
Patented Jan. 27, 1914.
2 SHEETS—SHEET 1.
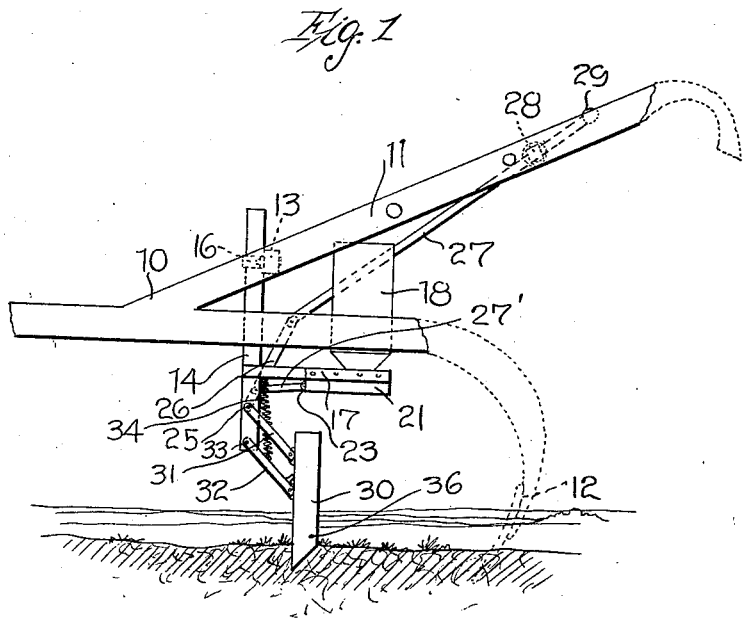
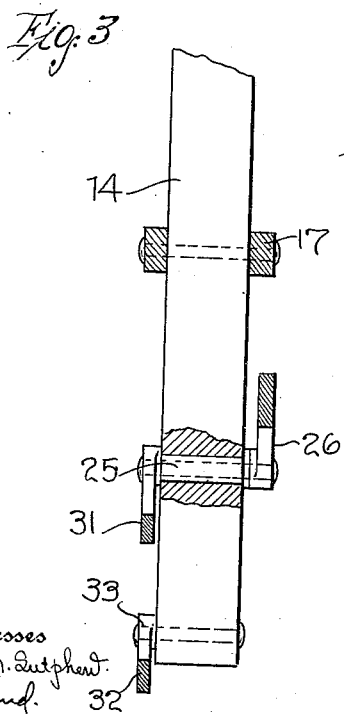
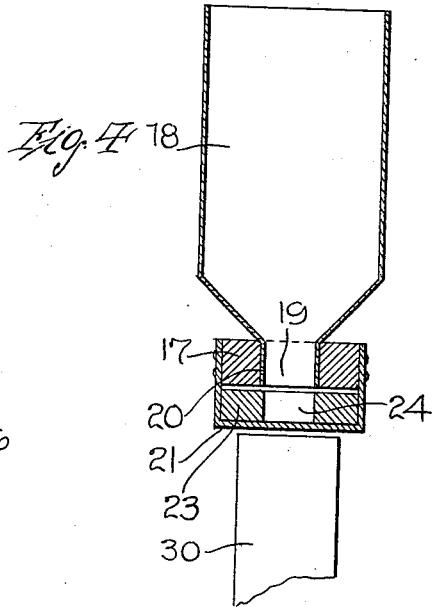
Inventor
GROVER C. KNIGHT
Witnesses
Robert M. Lutphen.
A. I. Hind.
By Watson E. Coleman
Attorney

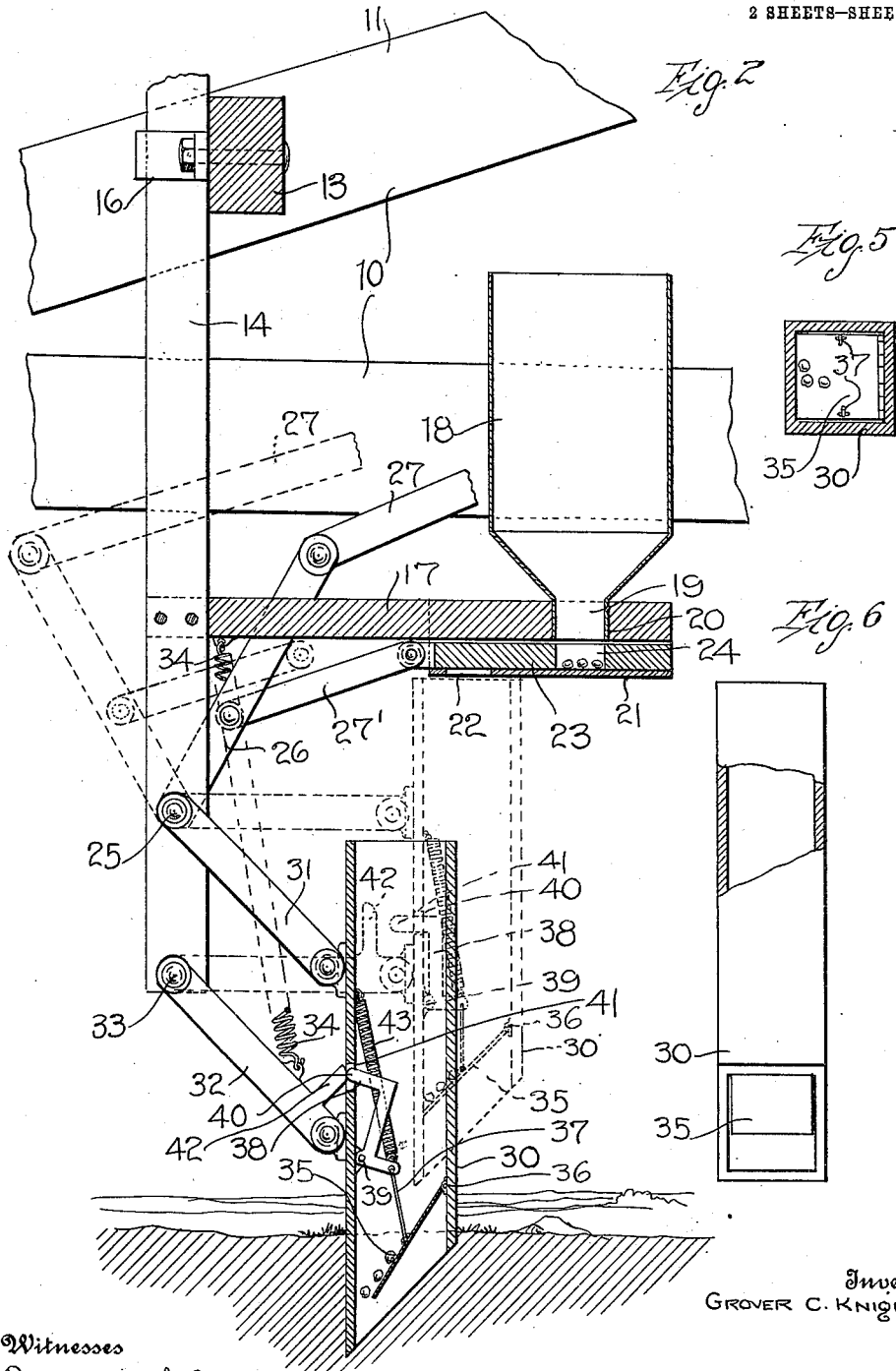

UNITED STATES PATENT OFFICE.

GROVER C. KNIGHT, OF GROVE, OKLAHOMA.

PLANTER AND CULTIVATOR.

1,085,438.   Specification of Letters Patent.   Patented Jan. 27, 1914.

Application filed March 24, 1913. Serial No. 756,525.

*To all whom it may concern:*

Be it known that I, GROVER C. KNIGHT, a citizen of the United States, residing at Grove, in the county of Delaware and State of Oklahoma, have invented certain new and useful Improvements in Planters and Cultivators, of which the following is a specification, reference being had to the accompanying drawings.

This invention relates to new and useful improvements in agricultural implements and more particularly to that class known as corn planters.

It is a well known fact that corn planters, no matter how efficient in their use, occasionally fail to plant a hill of corn. This only becomes known to the farmer when the corn commences to sprout. Furthermore, it ofttimes occurs that the corn has become injured and will fail to sprout, which causes a further irregularity in the spaces between the hills.

The object of this invention is to overcome this disadvantage in corn planting by the provision of an attachment which can be applied to a cultivator for the purpose of replanting these dead hills.

Another object of this invention is the provision of a corn planter such as described, which is adjustably and removably supported by a cultivator, and which can be operated to replant the dead hills, while the corn is undergoing the first cultivating process.

A further object of this invention is to improve and simplify devices of this character, rendering them comparatively simple and inexpensive to manufacture, reliable and efficient in use and readily operated.

Figure 1 is a side elevation of my invention; Fig. 2 is an enlarged longitudinal sectional view thereof, showing the planting foot lowered in full lines and raised in dotted lines; Fig. 3 is a detail view of a portion of the vertical bar; Fig. 4 is a transverse sectional view through the hopper; Fig. 5 is a horizontal sectional view taken through the planting foot; and Fig. 6 is an end view of the foot.

Referring to the accompanying drawings by similar characters of reference, the numeral 10 designates generally a cultivator, which consists of the usual handles 11, and plow share or shares 12. A transverse beam 13 connects the handles 11 a convenient distance in advance of the shares 12, and has secured thereto a vertically movable supporting bar 14, which is held rigid thereon by means of the clip 16. A horizontal bar 17 is attached to the vertical bar 14 in spaced relation from the lower end thereof and supports a seed hopper 18 formed in its lower end with an opening 19, which registers with the opening 20 formed in the rear extremity of the bar 17. A guide plate 21 is secured to the under side of the bar 17 and is formed with an opening 22, equal in size to the openings 19 and 20, but located preferably in advance thereof. A sliding feed bar 23 operates between the lower side of the bar 17 and upper face of the plate 21 and is formed with an opening 24 adapted to register with the openings 19 and 20 and the opening 22 for a purpose to be later disclosed.

A shaft 25 is journaled transversely of the bar 14 and has keyed to one end thereof upon one side of the bar 14 an operating arm 26, which is connected by a link 27' to the forward end of the sliding bar 23, while secured to the upper end of this arm 26 is an operating rod 27, which has its opposite terminal movably secured as at 28 to one of the handles 11, at which point the said rod 27 is equipped with a finger grip 29 by means of which the same can be moved longitudinally of the cultivator 10, for the purpose of revolving the shaft 25. Obviously, as the arm 26 is moved inwardly, the sliding bar 23 will be moved inwardly until the opening 24 registers with the openings 19 and 20, which permits a certain portion of the contents of the hopper 18 to enter the opening 24 and obviously as the rod 27 is moved forwardly, the seed contained within the opening 24 of the bar 23 will be moved forwardly until the opening 24 registers with the opening 22, at which time the seed will be dropped through the opening 22. A planting shoe 30 is disposed below the opening 22 for receiving the seed dropped from the opening 24 in the bar 23, and is pivoted at its inner end to the arms 31 and 32, the former of which is keyed to the shaft 25 while the latter is pivoted, as at 33, to the lower end of the bar 14. A spring 34 connects the arm 32 with the bar 17, for normally holding the shoe 30 in its raised position and in contact with the under side of the plate 21.

A closure 35 is pivoted, as at 36, within the lower end of the shoe 30 and is connected by a link 37 to a bell crank lever 38, pivoted, as at 39, in the forward side of the shoe 30. This bell crank lever 38 is provided with a lateral extension 40, which projects through an opening 41 in the forward side of the shoe 30 for contact with a trip finger 42, which is carried by the arm 32.

A spring 43 connects the lower arm of the bell crank lever with the shoe 30 above the lateral extension 40 and serves to normally retain the member 35 in its closed position. Obviously, however, upon the depression of the shoe 30, the trip finger strikes the offset end 40 of the lever 38, which forces the lower end of the lever 38 downwardly through the medium of the link 37 forces the closure 35 downwardly, thus permitting the contents of the shoe to drop therefrom through the lower end thereof.

The operation of the device is as follows:—After the bar 14 has been properly adjusted to its proper position upon the bar 13, and held thereon against displacement by the clip 16, the person using the machine cultivates the field of corn in the usual manner. When, however, he comes upon what has been termed a dead hill, he moves the machine until the shoe 30 is disposed thereover, and then draws the rod 27 rearwardly, which causes the depression of the shoe 30 and the operation of the closure 35 to plant additional seed in the dead hill.

As the shoe 30 is moved downwardly, the sliding bar 23 receives a supply of seed from the hopper 18 and as the rod 27' is moved forwardly again, this bar 23 moves forwardly and drops the seed into the planting shoe 30, where they are held by the closure 35 until the rod 27' is again moved rearwardly.

It should be noted in this connection that various minor changes in the specific details of construction can be resorted to within the scope of the appended claims without departing from or sacrificing any of the advantages of the invention.

From the foregoing description taken in connection with the accompanying drawings, it will be manifest that a corn planter such as described is provided which will fulfil all of the necessary requirements of such a device.

Having thus fully described this invention, what I desire to claim and protect by Letters Patent is:—

1. In a corn planter, the combination with a vertically movable support, a hopper carried thereby, a planting shoe connected to the support and vertically movable relatively thereto, means for conveying seed from the hopper to the planting shoe, a closure within the planting shoe, and means for simultaneously moving the planting shoe downwardly and operating the closure therein, as and for the purpose described.

2. In a corn planter, the combination with a movable support, arms pivotally connected thereto, a planting shoe carried by said arms, a closure within the planting shoe, a lever connected to the closure, a trip member carried by one arm for operating the lever thereby operating said closure, and means connected to the other arm for conveying seed to the planting shoe, as and for the purpose described.

3. In a corn planter, the combination with a movable support, a hopper connected to said support, a planting shoe connected to the support and movable relatively therewith, a sliding bar operating between the hopper and planting shoe, said bar having an opening therein adapted to register with said hopper and the planting shoe, and means for simultaneously moving said bar forward and moving the planting shoe upward and rearward with relation to the support for bringing said opening and said shoe into communication.

4. The combination in a corn planter with an adjustable bar, a second bar secured to the first mentioned bar and having an opening formed therein, a hopper secured to the second mentioned bar and having an opening formed in one end thereof in registration with the opening in the bar, a guide secured below the second mentioned bar, said guide having an opening formed therein of equal size to the openings in the bar and the hopper, a sliding bar disposed between the guide and the second mentioned bar, said sliding bar having an opening formed therein adapted to register with the openings in the second mentioned bar and the opening in the guide, a movable planting shoe disposed beneath one of said openings, and means for simultaneously operating the sliding bar and the planting shoe.

5. In a corn planter such as described, the combination with a cultivator frame, of a vertical bar adjustable thereon, a horizontal bar having an opening formed therein and secured to the vertical bar, a hopper secured to the horizontal bar and having an opening therein in registration with the opening in the horizontal bar, a guide plate secured beneath the horizontal bar and in spaced relation thereto, said guide plate having an opening formed therein, a sliding bar movable between the guide plate and the horizontal plate, said sliding bar having an opening therein adapted to register with the openings in the horizontal plate and the guide plate, arms pivoted to the vertical bar, a planting shoe pivoted to said arms, a closure pivoted within the planting shoe, a bell crank lever pivoted within the planting shoe, an offset extension upon the bell crank lever and projecting through an opening in the planting shoe, an operative connection between the bell crank lever and the closure, a spring for normally retaining the closure in raised position, a trip finger carried by one of the arms for engaging the offset portion of the bell crank lever, a spring connecting one of the arms and the horizontal bar for normally retaining the planting shoe in raised position, a second arm connected with one of the before mentioned arms and an operating rod connected to the second mentioned lever.

In testimony whereof I hereunto affix my signature in the presence of two witnesses.

GROVER C. KNIGHT.

Witnesses:
G. B. THOMPSON,
WM. D. ROSS.